United States Patent
Daghini et al.

(10) Patent No.: US 8,381,505 B2
(45) Date of Patent: Feb. 26, 2013

(54) METALLIC CORD COMPRISING PREFORMED AND NON-PREFORMED WIRES, RUBBER SHEET COMPRISING SAID CORD AND TYRE COMPRISING AT LEAST ONE LAYER DERIVED FROM SAID RUBBER SHEET

(75) Inventors: Guido Luigi Daghini, Milan (IT); Giuseppe Cereda, Milan (IT); Fabrizio Cristofani, Milan (IT); Simone Fanfani, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 143 days.

(21) Appl. No.: 12/988,783

(22) PCT Filed: Apr. 21, 2008

(86) PCT No.: PCT/IT2008/000276
§ 371 (c)(1),
(2), (4) Date: Jan. 5, 2011

(87) PCT Pub. No.: WO2009/144746
PCT Pub. Date: Dec. 3, 2009

(65) Prior Publication Data
US 2011/0099967 A1    May 5, 2011

(51) Int. Cl.
*D02G 3/48* (2006.01)
(52) U.S. Cl. ............................................ 57/212; 57/311
(58) Field of Classification Search .................. 57/212, 57/311
See application file for complete search history.

(56) References Cited

U.S. PATENT DOCUMENTS

| | | | |
|---|---|---|---|
| 4,586,324 A * | 5/1986 | Mizuma | 57/212 |
| 4,986,327 A * | 1/1991 | Takahira | 152/556 |
| 5,321,941 A | 6/1994 | Bollen et al. | |
| 5,473,878 A | 12/1995 | Hamiel et al. | |
| 5,595,057 A | 1/1997 | Kuriya | |
| 5,836,145 A | 11/1998 | Kohno | |
| 6,442,922 B1 | 9/2002 | Han | |
| 2001/0013385 A1 | 8/2001 | Ohya | |
| 2004/0060632 A1 | 4/2004 | Miyazaki et al. | |

FOREIGN PATENT DOCUMENTS

| | | |
|---|---|---|
| EP | 0 341 680 A1 | 11/1989 |
| EP | 0 669 421 A2 | 8/1995 |
| EP | 0 709 236 A1 | 5/1996 |
| EP | 0 790 349 A1 | 8/1997 |
| EP | 1 067 236 A2 | 1/2001 |
| EP | 1 112 868 A2 | 7/2001 |
| GB | 2 203 392 A | 10/1988 |
| WO | WO-01/10656 A1 | 2/2001 |

OTHER PUBLICATIONS

"Polygonally Preformed Steel Elements" Research Disclosure, Mason Publications, Hampshire, GB, XP000461309, No. 363, 13 pages (including pp. 359-365), (1994).
International Search Report from the European Patent Office for International Application No. PCT/IT2008/000276 (Mail date Jul. 22, 2009).
*Micro-alloyed steel cord constructions for tyres*, Mason publications, Hampshire, GB vol. 349, Nr. 84 (1993), 25 pages.

* cited by examiner

*Primary Examiner* — Shaun R Hurley
(74) *Attorney, Agent, or Firm* — Finnegan, Henderson, Farabow, Garrett & Dunner, L.L.P.

(57) ABSTRACT

A two-layer cord having a number of wires in the outer layer, enclosing, but not completely, a cord core formed by a plurality of core wires, and in which the core wires are not preformed, while at least some of the outer wires are preformed.

25 Claims, 4 Drawing Sheets

METALLIC CORD COMPRISING PREFORMED AND NON-PREFORMED WIRES, RUBBER SHEET COMPRISING SAID CORD AND TYRE COMPRISING AT LEAST ONE LAYER DERIVED FROM SAID RUBBER SHEET

CROSS REFERENCE TO RELATED APPLICATION

This application is a national phase application based on PCT/IT2008/000276, filed Apr. 21, 2008, the content of which is incorporated herein by reference.

FIELD OF THE INVENTION

The present invention relates to a metallic cord for reinforcing rubber articles, particularly rubberized sheets, more particularly for use in tyres.

More particularly, the present invention relates to a metallic cord comprising a first number of core wires surrounded by a second number of outer wires, wherein the outer wires comprise at least one preformed wire.

BACKGROUND OF THE INVENTION

Steel cords currently used in tyres for use with trucks or buses include a two-layer steel cord which comprises an inner layer comprising of a plurality of twisted filaments, and an outer layer comprising of a plurality of twisted filaments disposed around the first layer while being integral with the inner layer. A further example of steel cord used in tyres for trucks or buses includes a three-layer steel cord which further comprises an outermost layer consisting of a plurality of twisted filaments disposed around the outer layer of the two-layer steel cord.

A representative standard for a three-layer steel cord is a "3+9+15" construction. In brief explanation of a method for producing the three-layer steel cord having such a construction, three filaments are first twisted in a certain direction to form an inner layer. Subsequently, nine filaments are twisted in the same twist direction as that of the inner layer while using a twist pitch length different from that of the inner layer to form an intermediate layer, with the intermediate layer surrounding the inner layer while being integral with the inner layer. After that, fifteen filaments are twisted in a twist direction opposite to that of the intermediate layer while using a twist pitch length different from that of the intermediate layer to form an outer layer, with the outer layer surrounding the intermediate layer while being integral with the intermediate layer. A further filament may be twisted in a direction opposite to that of the outer layer while using a desired twist pitch length to form a spiral wrap, with the spiral wrap surrounding the outer layer while being integral with the outermost layer.

This three-layer steel cord is high in strength by virtue of the plurality of filaments, so that it is generally used for a carcass-reinforcing steel cord or a belt-reinforcing steel cord in large tyres used for trucks or buses. However, in the three-layer steel cord, the inner layer, intermediate layer, outer layer and spiral wrap are twisted in such a manner that these layers have different twist pitch length and/or different twist direction between the adjacent layers. Consequently, in the manufacture of such a steel cord, a twisting process is carried out for the inner layer, intermediate layer, outer layer, and spiral wrap, individually. This results in a reduction of productivity and an increase in the manufacturing costs.

EP 1067236 suggests to solve this problem by providing a two-layer steel cord including an inner layer consisting of three filaments and an outer layer consisting of seven or eight filaments and surrounding the inner layer, in which the inner layer and the outer layer are twisted in such a manner that they are equal in a twist direction and a twist pitch length to each other. According to EP 1067236, such steel cord has also an improved penetration of rubber into the steel cord, such that the steel cord has an improved durability upon application to tyres.

A similar cord is also disclosed in U.S. Pat. No. 5,473,878. In detail, one of the embodiments disclosed in U.S. Pat. No. 5,473,878 is a metallic cord for the reinforcement of elastomer used in the manufacture of tyres, which comprises a core composed of three metallic core filaments twisted about each other and a coaxial layer of eight metallic layer filaments arranged around the core filaments. The metallic core and layer filaments are twisted in the same direction at the same pitch. The metallic core filaments have a first diameter and the metallic layer filaments of the coaxial layer have a second diameter equal to the first diameter. According to U.S. Pat. No. 5,473,878, the result of constructing a cord with the size relationships afforded by the selection of the core and layer filament sizes and the number of layer filaments, is three spacings between the layer filaments which allows for direct contact of the core with the calender rubber conventionally applied to the cord. That is, a large surface area of the layer filaments is exposed, while at the same time exposing the core filaments to significant rubber penetration. Moreover, according to U.S. Pat. No. 5,473,878, the rubber penetration into the spacing due to the relationship of the sizes of the core filaments and the layer filaments provide effective interlocking between all of the filaments forming the cord.

U.S. Pat. No. 5,321,941 discloses a steel cord for the reinforcement of rubber articles. The steel cord comprises a core, consisting of two to four steel filaments and a layer of steel filaments completely enclosing said core. All the filaments have a diameter between 0.15 and 0.40 mm and are twisted in the same direction and at the same pitch. The cord has substantially over its entire length cross-sections which present gaps between adjacent filaments of the layer. The accumulated gaps are at least 0.03 mm. At least one filament of the layer has been preformed substantially differently from the other filaments. According to U.S. Pat. No. 5,321,941, appropriate preforming of at least one filament of the layer "creates"—together with the possible difference in diameters between the core filaments and the layer filaments—the gaps in the layer and, consequently, promotes rubber penetration. Moreover, according to U.S. Pat. No. 5,321,941 this cord also reduces core migration. One embodiment disclosed in U.S. Pat. No. 5,321,941 is a steel cord comprising three core filaments surrounded by nine layer filaments, three of which are preformed.

In order to improve rubber penetration without increasing the cord diameter, US 2004/0060632 suggests to provide metallic cords being made up of six to twelve metallic filaments whose diameter (d) is in a range of from 0.15 to 0.45 mm. The six to twelve metallic filaments include waved filaments and unwaved filaments, each of the waved filaments being two-dimensionally waved at a wave pitch Pw and wave height (h), the wave pitch Pw being in a range of from 5.0 to 35.0 times the diameter (d) of the filament, and the wave height (h) being in a range of from 0.2 to 4.0 times the diameter (d) of the filament. The metallic filaments are twisted together into the cord at a twist pitch Pc of from 10 to 40 mm so that the two-dimensionally waved filaments are each subjected to a certain rotation around its axial. According to US 2004/0060632, until the cord is rubberized, the two-dimensionally waved filaments become unstable, and gaps which effectively work on rubber penetration can be formed between the filaments without increasing the thickness of the finished cord. Two embodiments disclosed in US 2004/0060632 are examples of bead reinforcing cord composed of nine and twelve filaments, respectively. In a first example, five waved filaments and four unwaved filaments as a bunch are twisted into the cord while interchanging the positions of two filaments. In a second example, six waved filaments and six unwaved filaments as a bunch are twisted into the cord while interchanging the positions of two filaments. According to US 2004/0060632, when a plurality of filaments, as a single bunch, are twisted, the relative positions of the filaments are substantially not changed along the longitudinal direction, and closed spaces are liable to be formed among the filaments. Such closed spaces can be broken by upsetting the positional balance of the filaments. In order to effectively upset the positional balance, the positions of two filaments are intentionally interchanged.

WO 01/10656 relates to a steel cord, for reinforcing rubber articles, of the "3+6" type, specifically three core wires and six crown wires, having the same diameter of between 0.30 mm and 0.40 mm, in particular equal to 0.35 mm. According to WO 01/10656 this cord allows good penetration of the rubber from the outside towards the core wires, offering good resistance to the stresses in working conditions.

SUMMARY OF THE INVENTION

The Applicant has verified that "3+6" steel cords such as those disclosed in the above cited patent application no. WO 01/10656 may effectively be used in reinforcing layers of tyres suitable for trucks and/or buses (hereinafter simply truck tyres), since they provide good properties in terms of rubber penetration, stiffness and low diameter. In particular, rubber penetration is better than in cords having a "3+7", "3+8" or "3+9" structure, such as those disclosed in the above cited documents EP 1067236, U.S. Pat. No. 5,473,878 and U.S. Pat. No. 5,321,941, due to the lower number of wires in the outer layer (or crown) of the cord, which allows a better opening of the latter during a rubberizing step.

However, the Applicant has found that a surprisingly improved result in terms of rubber penetration could be obtained by using a cord having a higher number of wires in the outer layer, enclosing, but not completely, a cord core formed by a plurality of core wires, and in which the core wires are not preformed, while at least some of the outer wires are preformed. This result is remarkable, since the presence of a higher number of wires in the outer layer of the cord leads to a closer structure of the cord, which would counteract rubber penetration. On the contrary, it has been found that this cord may reach particularly high rubber penetration capability.

It has also been found that such cord also has a significantly improved breaking strength.

Both these features render the cord particularly suited for an application as a reinforcing layer for a tyre, particularly for an application as a main belt of a truck tyre.

According to an aspect, the invention relates to a metallic cord comprising a first number of core wires surrounded by a second number of outer wires, wherein:
- all of said core wires and said outer wires have substantially the same diameter;
- all of said core wires and said outer wires are twisted in said cord in the same twist direction and substantially with the same twist pitch;
- all of said core wires are non-preformed wires;
- at least some of said outer wires are preformed wires;
- said first number is higher than or equal to two;
- said second number is greater than said first number;
- said second number is lower than a third number being equal to a number of wires of the same diameter of said core wires, which, if disposed side by side around said first number of core wires and in contact with said first number of core wires, would completely enclose said first number of core wires.

For the purposes of the present invention, the expression "all of said core wires and said outer wires have substantially the same diameter" contemplates small differences among the diameters of the wires used in the cord of the invention, being compatible with typical fabrication tolerances in the drawing process leading to the formation of the wires (e.g. a maximum variation within ±0.01-0.02 mm).

Moreover, for the purposes of the present invention, the expression "all of said core wires and said outer wires are twisted in said cord substantially with the same twist pitch" contemplates small differences between the twist pitch of the core wires and the outer wires, being compatible with typical fabrication tolerances in the twisting process leading to the formation of the cord (e.g. a maximum variation within ±5-10%).

Briefly, the cord according to an aspect of the invention has a core with at least two non-preformed wires surrounded by an outer layer of wires, at least some of which are preformed. The wires of the core and the wires of the outer layer have substantially the same diameter and are twisted with substantially the same twist pitch. The number of wires in the outer layer of the cord is lower than the number of wires in the outer layer of a hypothetical so-called "compact cord" having the same number of core wires of the cord of the invention, in which the wires of the outer layer completely enclose the core wires. "Complete" enclosure herein refers to a space left between the wires of the outer layer being at most equal to a wire diameter. A reference to compact cords can be found in the above cited U.S. Pat. No. 5,321,941 (for example, reference can be made to FIGS. 1 and 2 of such patent).

As mentioned above, the Applicant has found that the cord of the invention has excellent rubber penetration. In particular, when a rubber sheet is formed comprising these cords, the rubber compound effectively penetrates even within the cord core, to an extent significantly higher than in a corresponding cord lacking preformed wires in the outer layer. A consequent strong reduction of the entrapped air between the various wires (particularly the core wires) is thus advantageously obtained.

Due to the excellent rubber penetration capability, the corrosion of the cords (particularly of the core wires of the cords) during use, e.g., of a tyre comprising a reinforcing layer formed by such rubber sheet, can be effectively counteracted. This advantageously allows use of wires made of NT steel, i.e. steel comprising a relatively low carbon content (around 0.7%), with a positive impact on the overall cord costs. However, use of HT, SHT, or UHT steel (having higher carbon content, respectively around 0.8%, 0.9%, 0.96%) for the cord wires is also contemplated by the invention. In general, a carbon content of the steel usable for the cords of the invention is higher than 0.6%.

The Applicant has also found that this cord has excellent tensile properties. In particular, the breaking strength of this cord could be made comparable with that of the above mentioned "3+9+15" cord, but with a much simpler structure and a smaller diameter. This represents a further strong advantage for the use of the cord in a tyre. This particularly applies to the use of the cord in a main belt of a truck tyre, since an overall high breaking strength of the main belt can be obtained (comparable with that obtainable with a conventional "3+9+15" cord), at the same time increasing the quantity of rubber compound disposed between the cords of the main belt: in such way, the stresses transmitted to the compound during use of the tyre can be more evenly distributed, with a consequent low fatigue of the compound.

The Applicant has also found that the use of preformed wires only in the outer layer of the cord lead to a high elastic modulus of the cord. This gives the cord a better stiffness and low deformability: such features are particularly suited for an employment of the cords in a belt layer of a tyre, more particularly in a main belt of a truck tyre.

In preferred embodiments, the difference between the third number and the second number is at most equal to two. Exemplary cords within the scope of the invention are "10×1" or "11×1" cords, or "3+8" or "3+7" cords, having three core wires respectively surrounded by seven or eight outer wires. The twisting of all the wires (both the core wires and the outer wires) forming the cord can be advantageously performed in a single step, with a high production rate.

The outer wires can be all preformed wires. Alternatively, preformed wires may alternate to non-preformed wires in the outer layer of the cord.

The diameter of the core wires and of the outer wires may be chosen to be comprised between 0.12 mm and 0.45 mm, preferably between 0.15 mm and 0.40 mm. This particularly applies for use in truck tyres: lower diameters could be used in light trucks, whereas higher diameters could be used for heavy load applications. More preferred cord embodiments can use wires having a diameter lower than 0.35 mm, so as to reduce the overall cord diameter.

Brass coating is typically applied to the cord wires. A different kind of coating (e.g. a Zn/Mn coating) could also be applied to the cord wires.

The cord could be equivalently twisted in "S" direction or in "Z" direction.

The twist pitch of the cord can be chosen to be comprised between 10 mm and 30 mm. Preferred embodiments may use a twist pitch of the cord greater than 18 mm. The adoption of a longer twist pitch may greatly reduce the flaring of the cord, particularly in case of use of three or more wires in the cord core. A reduced cord flaring may be of great advantage when the cord is used in a belt of a tyre comprising cords inclined with respect to the circumferential direction of the tyre (particularly a main belt layer of a truck tyre), in which the cords are cut at the ends of the belt layer. A reduced flaring maintains the cord wires closed to each other in the cord ends (i.e. in the belt ends), with a consequent lowering of the risk of damaging the belt ends, and/or of the risk of triggering starting points for corrosion.

According to another aspect, the invention relates to a sheet comprising a plurality of metallic cords as disclosed above, embedded in a rubber compound.

The thickness of the sheet may be chosen to be comprised between 1.80 mm and 2.60 mm. This particularly applies to sheets prepared for making reinforcing layers for tyres in which the cords are located at a quote corresponding to half the thickness of the sheet (symmetric sheets). Asymmetric sheets, in which the cords are typically located at a lower quote with respect to half the thickness of the sheet, could have higher thicknesses, up to 3.0-3.2 mm.

The density of the plurality of metallic cords in the sheet may be chosen to be comprised between 35 cords/dm and 70 cords/dm, preferably between 40 cords/dm and 55 cords/dm. This particularly applies to sheets prepared for making reinforcing layers (particularly main belt layers) of truck tyres.

Excessive cord density may render the rubber sheet too stiff, with a consequent fatigue of the rubber compound. On the other hand, a low density may lead to a feeble overall breaking strength of the sheet.

The embedding of the plurality of metallic cords in the rubber compound may be performed so as to alternate the cords with sheet portions comprising only rubber compound having substantially the same width. The width of the "only rubber compound portions" may be comprised between 0.45 mm and 0.90 mm. Preferred embodiments may use a width greater than 0.60 mm. This may improve the interworking between the cords and the compound, so that stresses are more evenly transferred from the cords to the compound and effectively distributed therein, so as to reduce compound fatigue.

According to a further aspect, the invention relates to a tyre comprising a carcass structure having ends terminating in beads, and a belt structure radially superimposed to said carcass structure, wherein said carcass structure comprises at least one carcass layer, wherein said belt structure comprises at least one belt layer, wherein said bead optionally comprises a bead reinforcing layer, and wherein at least one of said carcass layer, belt layer or bead reinforcing layer is derived from a sheet according to above.

In particular, the belt structure typically comprises at least two main belt layers being radially superimposed to each other and comprising metallic cords being substantially parallel to each other in each main belt layer and crossed to the metallic cords of the radially adjacent belt layer. The at least two main belt layers may be derived from a sheet according to the above.

The belt structure may also comprise a radially outer belt layer being adapted to counteract stone penetration. The radially outer belt layer may be also derived from a sheet according to the above.

BRIEF DESCRIPTION OF THE DRAWINGS

Further features and advantages of the present invention will be made apparent by the following detailed description of exemplary embodiments thereof, provided merely by way of non-limitative examples. The description will make reference to the attached drawings, wherein.

DETAILED DESCRIPTION OF THE INVENTION

Figure 1:
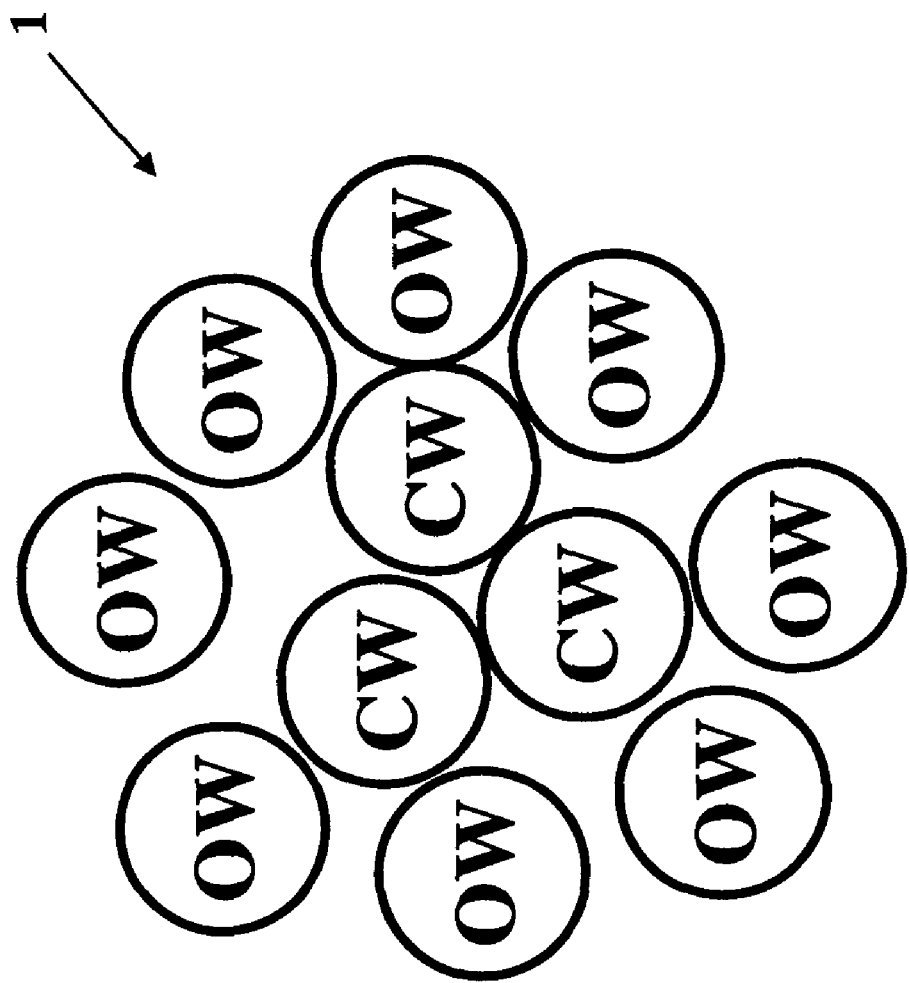
FIG. 1 schematically shows a transverse section of a cord according to an embodiment of the invention.

FIG. 1 schematically shows a transverse section of a two-layer cord 1 according to an embodiment of the invention. The cord 1 comprises three core wires CW and eight outer wires OW surrounding the core wires CW. All the wires CW and OW have the same diameter and are twisted in the same direction (e.g. S) at the same twist pitch. The wires CW and OW are typically made of steel (NT, HT, SHT or UHT steel), and are typically coated with brass or another corrosion resistant coating (e.g. a Zn/Mn coating). An additional coating step could be also performed to the cord, after the twisting of the core wires CW and of the outer wires OW.

In more detail, the core wires CW are non-preformed wires, whereas at least some or all of the outer wires OW are preformed wires. In case only some of the outer wires OW are preformed, it is preferable to distribute them as evenly as possible around the core of the cord 1 formed by the core wires CW. The cord 1 has a structure which could be almost equivalently referred to as "11×1" or "3+8".

It has to be noticed that the eight outer wires OW do not completely enclose the core wires CW as in a compact (or closed, or regular) cord. In fact, a compact cord would have nine wires having the same diameter of the core wires CW disposed around the core. Spaces are thus formed between the outer wires OW in the cord of the invention, so that the sum of such spaces is greater than the diameter of a single wire.

Notwithstanding the above, the core wires CW do not migrate from the core of the cord 1, since the outer wires OW distribute themselves as a crown around the core wires CW. The spaces between the outer wires OW (which vary in position and extent along the longitudinal extension of the cord 1 due to the preforming of at least some of the outer wires OW) allow effective rubber penetration towards the core wires CW during rubberizing operations. Rubber penetration also occurs within the core formed by the core wires CW, with a strong reduction of the entrapped air. The use of a long twist pitch (e.g. greater than 18 mm) may further improve rubber penetration. Moreover, a long twist pitch may preserve the preforming waveform of the preformed outer wires OW.

The two-layer cord 1 of FIG. 1 can be manufactured by twisting the three core wires CW to form the cord core, while twisting the eight outer filaments OW to form the outer layer of the cord 1, such that a single step is used to complete the two-layer steel cord 1. Conventional apparatus, not critical for the present invention, could be used for performing the twisting of the core wires CW and outer wires OW.

Figure 2:
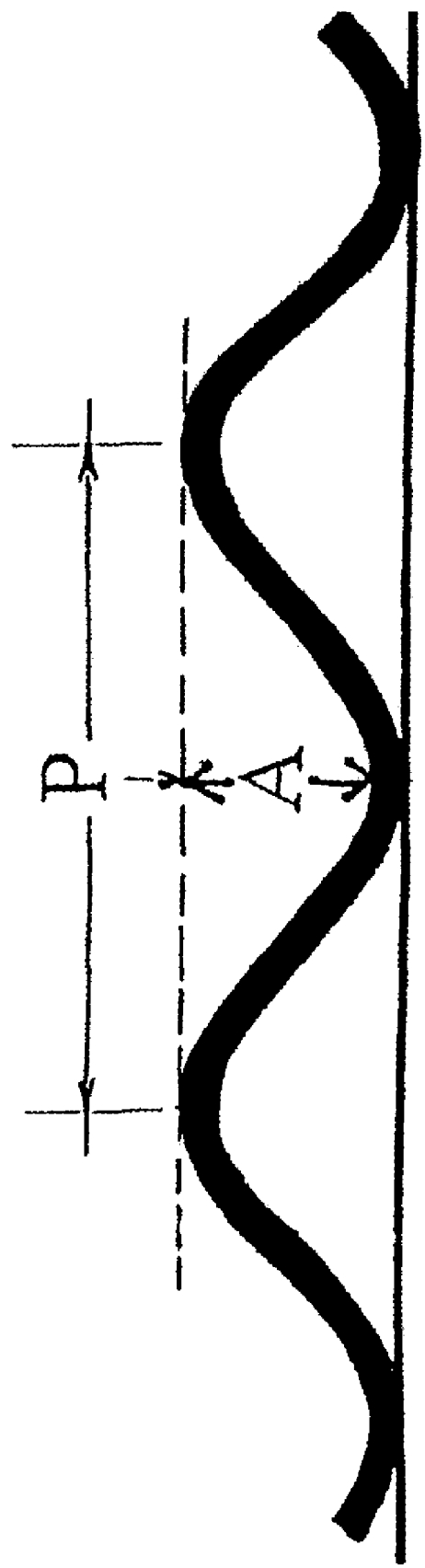
FIG. 2 schematically shows a portion of an exemplary preformed wire.

FIG. 2 schematically shows a portion of an exemplary sinusoidally preformed wire usable in the outer layer of the cord 1. The sinusoidal waveform should not be considered as a feature limiting the scope of the present invention: other performing waveforms (i.e. square waveform, triangular waveform, zigzag waveform, saw-tooth waveform, etc.) could be applied to the wires destined to the outer layer of the cord 1. The preforming could be advantageously performed in one plane (i.e. the performing waveform preferably lies on a plane), with any suitable preforming apparatus. A peak-to-peak height A of the preforming waveform greater than the diameter of the wire could be provided. A wavelength P of the preforming waveform greater than three-four times the diameter of the wire could be provided.

Figure 3:
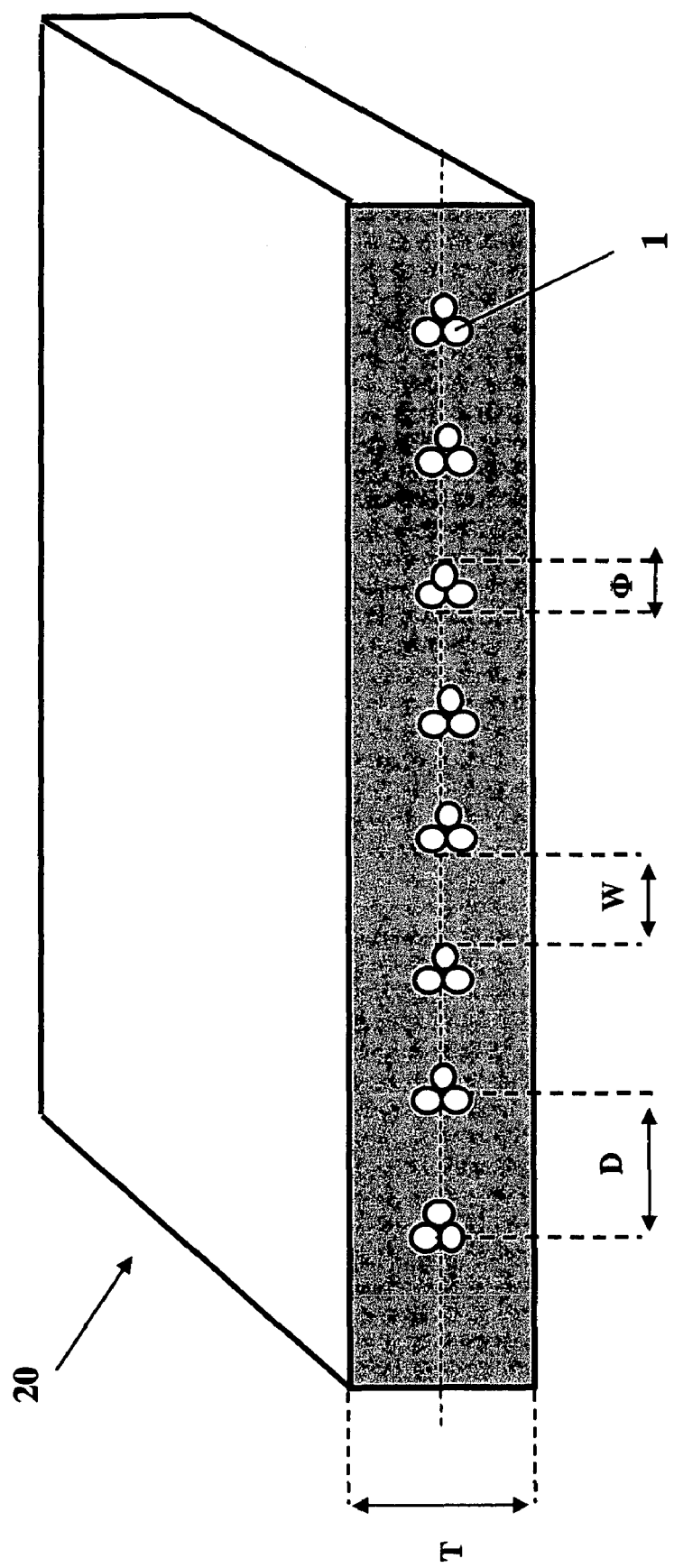
FIG. 3 schematically shows a sectional view of a rubberized sheet according to another aspect of the invention.

FIG. 3 schematically shows a sectional view of a rubberized sheet 20 including cords 1 according to the present invention, such as the cord 1 of FIG. 1. The sheet 20 could be produced by conventional methods, e.g. by coupling a plurality of cords with rubber in a calendering apparatus. The cords 1 included in the sheet 20 are disposed substantially parallel to each other. Parameters characterizing the sheet may include a density of the cords 1 (typically expressed in cords/dm) and a thickness T of the sheet 20. Other parameters shown in FIG. 3 are the average diameter $\phi$ of the cords 1, the centre-to-centre distance D between the cords 1 (i.e. the inverse of the cord density), the width W of the portions of the sheet 20 located between the cords 1 and comprising only rubber compound. Reinforcing layers for tyres could be derived from the sheet 20.

Figure 4:
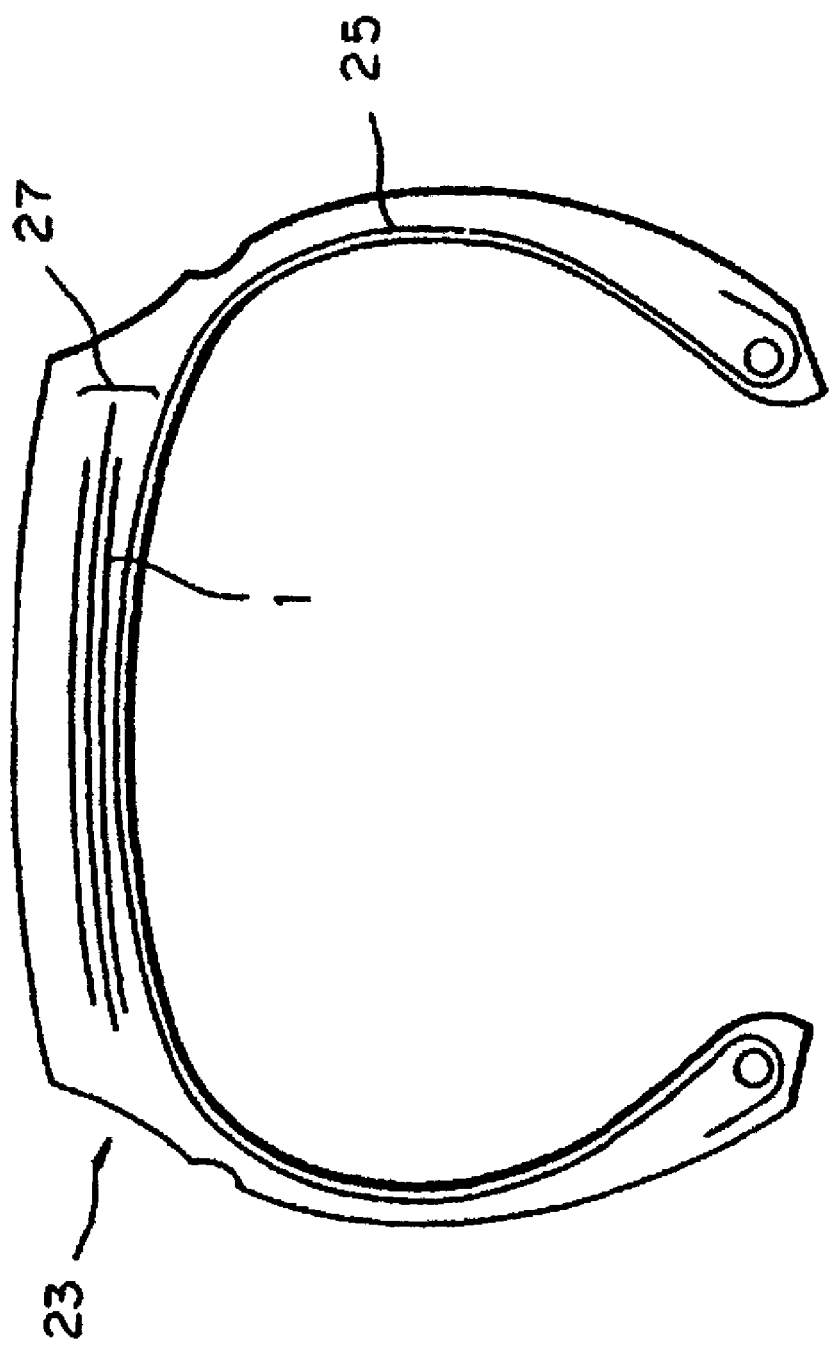
FIG. 4 schematically shows a transverse section of a tyre according to another aspect of the invention.

FIG. 4 shows in a very schematic way sufficient for the purposes of the present invention a tyre 23 having a carcass structure 25 comprising at least one carcass layer and a belt structure 27 comprising a plurality of belt layers. The layers of the carcass and/or the belt structure of the tyre are reinforced with cords 1 according to the invention. Other reinforcements included in the tyre 23 could also comprise cords 1 according to the invention, such as a bead reinforcing layer (e.g. a chafer, a wrapping chafer, or a flipper), for example.

In particular, the cords of the invention are particularly suited for the layers of the belt structure 27 of truck tyres. Typically, the belt structure of a truck tyre comprises at least two superimposed main belt layers in which the cords are oriented obliquely to a circumferential direction of the tyre in each layer. The orientations of the cords are crossed to each other in the superimposed layers. In preferred embodiments, the main belt layers comprise the cords of the invention. Typically the belt structure of a truck tyre also comprises an outer belt layer being disposed to counteract stone penetration towards the inner layers during use of the tyre. The outer belt layer may comprise the cords of the invention, alternatively or in combination with the use of the same cords in the main belt layers. In the latter case, a density of the cords within the outer belt layer can be preferably lower than a density of the cords in the main belt layers. Some belt structures of truck tyres may comprise an additional belt layer disposed between the carcass structure and the main belt layers. The cords of the invention may be employed also in such additional layer.

Due to their excellent properties in terms of rubber penetration, the cords of the invention resist to corrosion caused by humidity entrapped within the rubber compound during use of the tyre. The resistance to corrosion, together with other features of the cords of the invention (such as the breaking strength and the lower tendency to flaring at cut ends), make these cords particularly suited for a use in the belt layers of the tyre, allowing (possible multiple) retreading of the latter at the end of life of its tread.

EXAMPLE 1

An exemplary "11×1" cord according to the invention, as that shown in FIG. 1, was prepared, having the features reported in Table 1. All the outer wires were sinusoidally preformed with a waveform having a peak-to-peak height of about 0.4 mm and a wavelength of about 2 mm, whereas the three core wires were non-preformed wires.

TABLE 1

| Core Wire (CW) diameter | 0.33 mm |
| Outer Wire (OW) diameter | 0.33 mm |
| Twist direction | S |
| Twist pitch | 20 mm |
| Steel | NT |
| Wire Coating | Brass |

A comparison cord, having a "3+6" structure formed by non-preformed wires with the features of Table 2 was also prepared.

TABLE 2

| Core Wire (CW) diameter | 0.35 mm |
| Outer Wire (OW) diameter | 0.35 mm |
| Twist direction | S |
| Twist pitch | 18 mm |
| Steel | HT |
| Wire Coating | Brass |

Table 3 reports the results of some tests performed on the two cords. In particular, the tensile features and the rubber penetration capability of the cords were evaluated. In particular, the rubber penetration capability was evaluated on a green sheet portion comprising a number of cords, as well as on vulcanized specimens comprising a cord (both with a new specimen and an aged specimen), by measuring the force needed for extracting the cords from the sheet portion or from the specimens (Adhesion Force). A further parameter reported in Table 3 relates to the degree of rubber coverage of the cord pulled out from the specimens in the Adhesion Force test (Coverage).

Moreover, a further test was performed by measuring the content of air entrapped in specimens (both green and vulcanized) of rubberized cords. The results reported in Table 1 take as reference value "100" the rubber penetration capability of the comparison "3+6" cord for all the measurements performed.

TABLE 3

|  | 3 × 0.35 + 6 × 0.35* | 3 × 0.33 + 8 × 0.33 |
|---|---|---|
| Average breaking strength (N) | 2450 | 2630 |
| Ultimate elongation (%) | 1.8-2.1 | 2.0-2.2 |
| Part load elongation (%) at 2.5 N-5 N-10 N | 0.007-0.012-0.022 | 0.04-0.055-0.07 |
| Entrapped air (green spec.) | 100 | 75 |
| Entrapped air (vulcanized spec.) | 100 | 83 |
| Adhesion Force (green sheet portion) | 100 | 129 |
| Adhesion Force/ Coverage (%) (vulcanized cord specimen) | 100/95 | 113/100 |
| Adhesion Force/ Coverage (%) (vulcanized aged cord specimen) | 100/80 | 115/95 |

(*comparison)

As it can be seen from the data reported in Table 3, the exemplary cord of the invention shows greatly improved tensile properties and rubber penetration capability. With particular reference to the latter, it should be noted that the cord of the invention presents a significantly higher part load elongation (i.e. a higher capability to elongate also at low imparted load) due to the presence of the preformed outer wires: the Applicant believes that this feature is linked to the rubber penetration capability of the cord of the invention (the higher the part load elongation, the higher the rubber penetration capability).

EXAMPLE 2

Four exemplary cords were prepared, having eleven wires disposed in a "11×1" structure. In all the tests, the wires had a diameter of 0.33 mm and the twist pitch of the cords was set to 20 mm. The wires were brass coated SHT steel wires.
1) A first cord (comparison) was a cord formed by eleven non-preformed wires.
2) A second cord (comparison) was a cord formed by eleven preformed wires.
3) A third cord (invention) was a cord formed by three non-preformed core wires surrounded by eight preformed wires (peak to peak height 0.40 mm, wavelength 2 mm).
4) A fourth cord (invention) was a cord formed by three non-preformed core wires surrounded by a crown of eight wires, comprising non-preformed wires alternated to preformed wires.

Table 4 reports the properties and the rubber penetration capability (entrapped air) of the four cords 1) to 4). The rubber penetration capability values are reported taking as a reference value "100" the rubber penetration of the cord 1) formed by non-preformed wires.

TABLE 4

|  | 1* | 2* | 3 | 4 |
|---|---|---|---|---|
| Breaking strength (N) | 3090 | 2820 | 2890 | 3000 |
| Ultimate Elong. (%) | 2.32 | 2.46 | 2.35 | 2.54 |
| Average Diam. (mm) | 1.38 | 1.35 | 1.36 | 1.39 |
| Entrapped Air | 100 | 45 | 55 | 58 |
| Maximum Compress. Load (N) | 145 | 120 | 147 | 148 |

(*comparison)

The results shown in Table 4 show the excellent rubber penetration capability given to the cord by the presence of preformed wires. It has to be noticed that cord 2), having all preformed wires (both in the core and in the crown), has poor resistance to compressive forces, which makes such cord unsuitable for an effective employment in belt layers of tyres.

EXAMPLE 3

Three rubberized sheets were prepared comprising a plurality of different types of parallel cords.
1) thickness 2.40 mm, cord "3+9+15" formed by non-preformed wires having a diameter 0.22 mm, cord density 45 cords/dm, NT steel (comparison).
2) thickness 2.10 mm, cord "3+6" formed by non-preformed wires having a diameter of 0.35 mm, cord density 48 cords/dm, HT steel (comparison).
3) thickness 2.20 mm, cord "3+8" formed by three non-preformed core wires surrounded by eight preformed outer wires having a diameter of 0.33 mm, cord density 48 cords/dm, NT steel (invention).

Table 5 shows some properties of the three rubberized sheets.

TABLE 5

|  | 3 + 9 + 15 × 0.22* | 3 + 6 × 0.35* | 3 + 8 × 0.33 |
|---|---|---|---|
| Average cord diameter (mm) | 1.64 | 1.37 | 1.36 |
| Centre-to-centre distance (mm) | 2.22 | 2.08 | 2.08 |
| Width of only rubber portions between cords (mm) | 0.58 | 0.71 | 0.72 |
| % steel (average diam × cord density) | 74 | 66 | 65 |
| Sheet breaking strength (N) | 128000 | 118000 | 127000 |
| Sheet stiffness (TEX) | 47 | 73 | 70 |

(*comparison)

The above results show that the cord of the invention may allow the manufacture of rubberized sheets reaching substantially comparable breaking strength of rubberized sheets reinforced with "3+9+15" cords, with a much lower cord manufacturing complexity. Remarkably, this result is obtained with an increased width of the only rubber compound portions located between the cords, which allows a better distribution of the stresses transmitted from the cords to the compound, with a lower fatigue of the latter.

The invention claimed is:

1. A metallic cord comprising a first number of core wires surrounded by a second number of outer wires, wherein:
   all of said core wires and said outer wires have substantially a same diameter;
   all of said core wires and said outer wires are twisted in said cord in a same twist direction and substantially with a same twist pitch;
   all of said core wires are non-preformed wires;
   at least some of said outer wires are preformed wires;
   said first number is higher than or equal to two;
   said second number is greater than said first number; and
   said second number is lower than a third number being equal to a number of wires of the same diameter of said core wires, which, if disposed side by side around said first number of core wires and in contact with said first number of core wires, would completely enclose said first number of core wires.

2. The metallic cord according to claim 1, wherein a difference between said third number and said second number is at most equal to two.

3. The metallic cord according to claim 1, wherein said first number is equal to two, three or four.

4. The metallic cord according to claim 3, wherein said second number is equal to seven or eight.

5. The metallic cord according to claim 1, wherein all of said outer wires are preformed wires.

6. The metallic cord according to claim 1, wherein said outer wires comprise preformed wires alternated with non-preformed wires.

7. The metallic cord according claim 1, wherein said diameter of said core wires and outer wires is between 0.12 mm and 0.45 mm.

8. The metallic cord according to claim 1, wherein said diameter is lower than 0.35 mm.

9. The metallic cord according to claim 1, wherein said core wires and outer wires comprise steel having a carbon content of at least 0.6%, 10. The metallic cord according to claim 1, wherein said twist pitch is between 10 mm and 30 mm.

11. The metallic cord according to claim 1, wherein said twist pitch is greater than 18 mm.

12. A sheet comprising a plurality of metallic cords according to claim 1 embedded in a rubber compound.

13. The sheet according to claim 12, wherein a thickness of said sheet is between 1.80 mm and 3.20 mm.

14. The sheet according to claim 12, wherein a density of said plurality of metallic cords in said sheet is between 35 cords/dm and 70 cords/dm.

15. The sheet according to claim 12, wherein said plurality of metallic cords is embedded in said rubber compound so as to alternate with sheet portions comprising only rubber compound having substantially a same width of between 0.45 mm and 0.90 mm.

16. The sheet according to claim 15, wherein said width of said sheet portions comprising only rubber compound is greater than 0.60 mm.

17. The metallic cord according to claim 1, wherein the second number is less than the sum of the first number and 6.

18. The metallic cord according to claim 17, wherein the second number is greater than the sum of the first number and 4.

19. A tyre comprising a carcass structure having ends terminating in beads, and a belt structure radially superimposed on said carcass structure, wherein said carcass structure comprises at least one carcass layer, wherein said belt structure comprises at least one belt layer, and wherein at least one of said carcass layer, belt layer or bead reinforcing layer is derived from a sheet comprising a plurality of metallic cords embedded in a rubber compound, said metallic cords comprising a first number of core wires surrounded by a second number of outer wires, wherein:
   all of said core wires and said outer wires have substantially a same diameter;
   all of said core wires and said outer wires are twisted in said cord in a same twist direction and substantially with a same twist pitch;
   all of said core wires are non-preformed wires;
   at least some of said outer wires are preformed wires;
   said first number is higher than or equal to two;
   said second number is greater than said first number; and
   said second number is lower than a third number being equal to a number of wires of the same diameter of said core wires, which, if disposed side by side around said first number of core wires and in contact with said first number of core wires, would completely enclose said first number of core wires.

20. The tyre according to claim 19, wherein said bead comprises a bead reinforcing layer.

21. The tyre according to claim 19, wherein said belt structure comprises at least two main belt layers radially superimposed upon each other and comprising reinforcing cords substantially parallel with each other in each main belt layer and crossed with the reinforcing cords of the radially adjacent belt layer, wherein said at least two main belt layers are derived from a sheet comprising a plurality of metallic cords embedded in a rubber compound, said metallic cords comprising a first number of core wires surrounded by a second number of outer wires, wherein:
   all of said core wires and said outer wires have substantially a same diameter;
   all of said core wires and said outer wires are twisted in said cord in a same twist direction and substantially with a same twist pitch;
   all of said core wires are non-preformed wires;
   at least some of said outer wires are preformed wires;
   said first number is higher than or equal to two;
   said second number is greater than said first number; and
   said second number is lower than a third number being equal to a number of wires of the same diameter of said core wires, which, if disposed side by side around said first number of core wires and in contact with said first number of core wires, would completely enclose said first number of core wires.

22. The tyre according to claim 19, wherein said belt structure comprises a radially outer belt layer adapted to counteract stone penetration, wherein said radially outer belt layer is derived from a sheet comprising a plurality of metallic cords embedded in a rubber compound, said metallic cords comprising a first number of core wires surrounded by a second number of outer wires, wherein:
   all of said core wires and said outer wires have substantially a same diameter;
   all of said core wires and said outer wires are twisted in said cord in a same twist direction and substantially with a same twist pitch;
   all of said core wires are non-preformed wires;
   at least some of said outer wires are preformed wires;
   said first number is higher than or equal to two;
   said second number is greater than said first number; and
   said second number is lower than a third number being equal to a number of wires of the same diameter of said core wires, which, if disposed side by side around said first number of core wires and in contact with said first number of core wires, would completely enclose said first number of core wires.

23. The tyre according to claim 22, wherein said belt structure comprises at least two main belt layers radially superimposed upon each other and comprising reinforcing cords substantially parallel with each other in each main belt layer and crossed with the reinforcing cords of the radially adjacent belt layer, wherein said belt structure further comprises an additional belt layer disposed between said carcass structure and said at least two main belt layers, wherein said additional belt layer and said at least two main belt layers are derived from a sheet comprising a plurality of metallic cords embedded in a rubber compound, said metallic cords comprising a first number of core wires surrounded by a second number of outer wires, wherein:

all of said core wires and said outer wires have substantially a same diameter;

all of said core wires and said outer wires are twisted in said cord in a same twist direction and substantially with a same twist pitch;

all of said core wires are non-preformed wires;

at least some of said outer wires are preformed wires;

said first number is higher than or equal to two;

said second number is greater than said first number; and said second number is lower than a third number being equal to a number of wires of the same diameter of said core wires, which, if disposed side by side around said first number of core wires and in contact with said first number of core wires, would completely enclose said first number of core wires.

24. The tyre according to claim 19, wherein the second number is less than the sum of the first number and 6.

25. The tyre according to claim 24, wherein the second number is greater than the sum of the first number and 4.

* * * * *

UNITED STATES PATENT AND TRADEMARK OFFICE
CERTIFICATE OF CORRECTION

| | | |
|---|---|---|
| PATENT NO. | : 8,381,505 B2 | Page 1 of 1 |
| APPLICATION NO. | : 12/988783 | |
| DATED | : February 26, 2013 | |
| INVENTOR(S) | : Daghini et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 218 days.

Signed and Sealed this
Thirty-first Day of March, 2015

Michelle K. Lee
*Director of the United States Patent and Trademark Office*